UNITED STATES PATENT OFFICE.

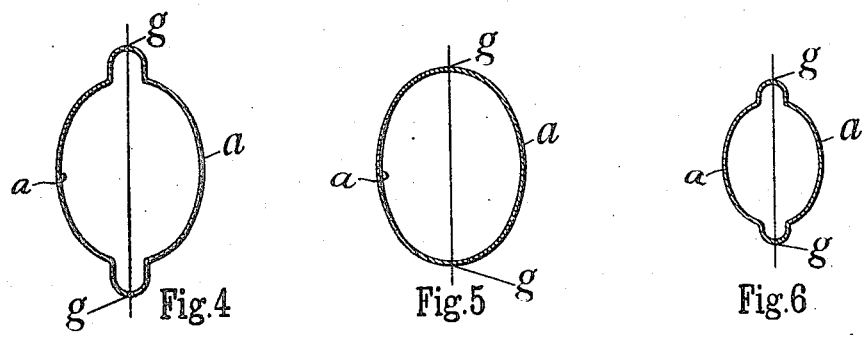
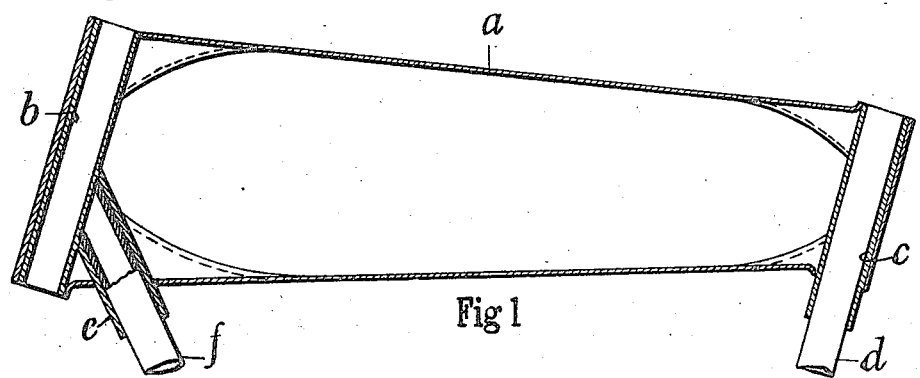
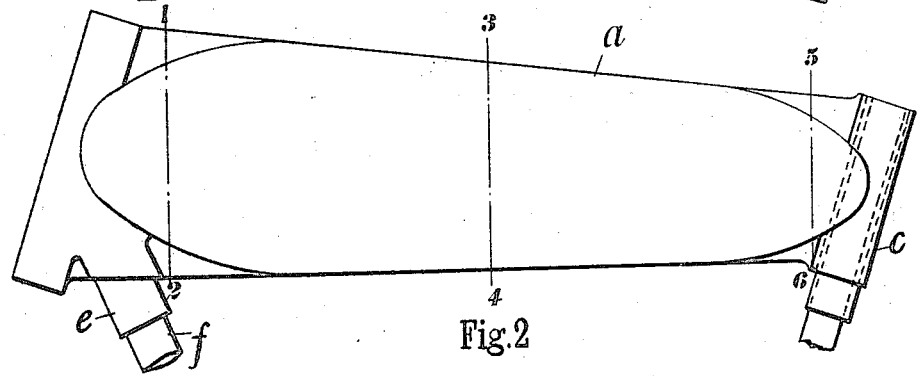
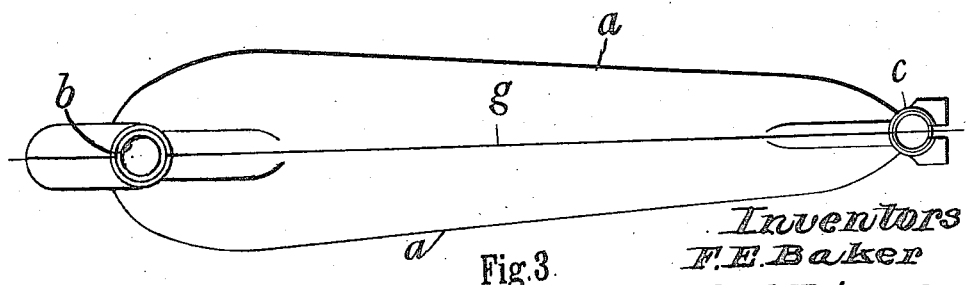

FRANK EDWARD BAKER AND THEODORE JAMES BIGGS, OF BIRMINGHAM, ENGLAND.

MOTOR CYCLE.

1,416,315.　　　　　Specification of Letters Patent.　Patented May 16, 1922.

Application filed February 10, 1920. Serial No. 357,609.

(GRANTED UNDER THE PROVISIONS OF THE ACT OF MARCH 3, 1921, 41 STAT. L., 1313.)

*To all whom it may concern:*

Be it known that we, FRANK EDWARD BAKER and THEODORE JAMES BIGGS, both residing at Precision Works, King's Norton, in the city of Birmingham, England, subjects of the King of Great Britain and Ireland, have invented certain new and useful Improvements Relating to Motor Cycles, (for which we have filed an application in Great Britain, Nov. 23rd, 1916, Patent No. 108,981,) of which the following is a specification.

This invention relates to motor cycles and has for its object to provide an improved construction whereby the petrol or other fuel tank is incorporated in the main frame.

The invention comprises the employment of a pair of sheet metal pressings which are united longitudinally to form the tank and the upper member of the frame, and are adapted to embrace the head tube and sockets for the seat and down tubes.

Referring to the accompanying sheet of explanatory drawings:—

Figure 1 is a longitudinal section of a petrol tank constructed in accordance with this invention, Figure 2 is a side elevation and Figure 3 a plan of the tank.

Figures 4, 5 and 6 are respectively cross sections on 1—2, 3—4, 5—6, Figure 2.

In carrying the invention into effect as shown, a sheet metal pressing $a$ is shaped throughout the greater part of its length to form one half of the tank. The upper and lower edges are in the same plane and coincide with the longitudinal central vertical plane of the finished article. Two of these pressings $a$ form the finished tank. The front ends of the pressings are shaped to embrace the head tube $b$ of the cycle frame, while the rear ends of the pressings are shaped to embrace a socket $c$ for the tube $d$ of the cycle frame. We also prefer to shape the front ends of the pressings $a$ to embrace a socket $e$ for the down tube $f$ of the cycle frame. Two such pressings are placed together over the said members of the frame and united along their edges at $g$ by welding or in any other convenient manner. They are also welded or brazed to the sockets they embrace.

In the construction shown the socket $e$ consists of a tube which is welded or brazed at one end to the tube $b$.

The tank may be made in a variety of different forms.

Having thus described our invention what we claim as new and desire to secure by Letters Patent is:—

1. In motor cycle frames, the combination with head, down and seat tubes, of a pair of sheet metal parts shaped to form a tank and the upper member of the cycle frame and adapted to embrace the head tube and seat and down tubes of the said frame, the said parts being united along their abutting edges, substantially as described.

2. In motor cycle frames, the combination with a head tube and sockets for the seat and down tubes of a pair of sheet metal parts shaped to form a tank and the upper member of the cycle frame, the head, tube, and sockets for the seat and down tubes being embraced by said parts and the latter being united along their abutting edges.

In testimony whereof we have signed our names to this specification.

FRANK EDWARD BAKER.
THEODORE JAMES BIGGS.